United States Patent
Dellis et al.

(10) Patent No.: US 12,510,407 B2
(45) Date of Patent: Dec. 30, 2025

(54) STACKABLE MOLECULAR SPECTROSCOPY CELL

(71) Applicant: TEXAS INSTRUMENTS INCORPORATED, Dallas, TX (US)

(72) Inventors: Argyrios Dellis, McKinney, TX (US); Adam Fruehling, Garland, TX (US); Simon Joshua Jacobs, Lucas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1037 days.

(21) Appl. No.: 17/490,938

(22) Filed: Sep. 30, 2021

(65) Prior Publication Data
US 2023/0095040 A1    Mar. 30, 2023

(51) Int. Cl.
*G01J 3/02* (2006.01)
*G01J 3/433* (2006.01)

(52) U.S. Cl.
CPC ............. *G01J 3/0291* (2013.01); *G01J 3/433* (2013.01)

(58) Field of Classification Search
CPC ............ G01J 3/0291; G01J 3/433; G04F 5/14
USPC ....................................................... 422/68.1
See application file for complete search history.

(56) References Cited

U.S. PATENT DOCUMENTS

| | | |
|---|---|---|
| 10,131,115 B1 * | 11/2018 | Fruehling ............ H04B 1/3827 |
| 10,364,144 B2 | 7/2019 | Herbsommer et al. |
| 10,493,722 B2 | 12/2019 | Fruehling et al. |
| 10,498,001 B2 | 12/2019 | Fruehling et al. |
| 10,549,986 B2 | 2/2020 | Herbsommer et al. |
| 10,775,422 B2 | 9/2020 | Fruehling et al. |
| 10,809,668 B2 | 10/2020 | Fruehling et al. |
| 10,900,837 B2 | 1/2021 | Fruehling et al. |
| 10,913,654 B2 | 2/2021 | Fruehling et al. |

* cited by examiner

*Primary Examiner* — Jill A Warden
*Assistant Examiner* — Jacqueline Brazin
(74) *Attorney, Agent, or Firm* — Mandy Barsilai Fernandez; Frank D. Cimino

(57) ABSTRACT

A stackable molecular spectroscopy cell includes a hollow body, a first cap affixed to a first surface of the hollow body, covering a first opening in the hollow body, and a second cap affixed to a second surface of the hollow body, covering a second opening in the hollow body, and forming a sealed cavity within the hollow body. The sealed cavity contains a dipolar gas having a pressure of less than 0.5 mbar. The stackable molecular spectroscopy cell also includes a metal layer covering an inner surface of the hollow body and an inner surface of the first and second caps, including a first aperture in the metal layer covering the inner surface of the first cap and a second aperture in the metal layer covering the inner surface of the second cap.

16 Claims, 11 Drawing Sheets

STACKABLE MOLECULAR SPECTROSCOPY CELL

BACKGROUND

Molecular spectroscopy in the microwave to millimeter wave region is used in constructing microwave or millimeter wave atomic clocks and other systems that require accurate timing signals. Atomic clocks excite the gas within a gas cell using millimeter wave radiation induced by a radio frequency (RF) transceiver and the system detects the rotational quantum transition of dipolar molecules for a reference.

The gas cell is ideally a hermetically sealed environment including a desired target gas at a stable low pressure. Millimeter wave chip-scale atomic clocks (mmWCSAC) are used in a variety of product applications to provide a highly stable and accurate clock signal. Contemplated mmWCSAC designs integrate a chip-scale gas cell (molecular spectroscopy cell) with an application specific integrated circuit (ASIC).

Molecular spectroscopy cells are also used within millimeter wave (mmW) spectroscopes for the detection and identification of various compounds in a wide variety of applications. Typical mmW spectroscopes are large, expensive machines, sensitive to noise and background fluctuations. Many applications require fast and precise measurements. Also, since the machines are expensive, time spent using the spectroscope is at a premium, and any wasted time is costly.

SUMMARY

In an implementation, a stackable molecular spectroscopy cell includes a hollow body, a first cap affixed to a first surface of the hollow body, covering a first opening in the hollow body, and a second cap affixed to a second surface of the hollow body, covering a second opening in the hollow body, and forming a sealed cavity within the hollow body. The sealed cavity contains a dipolar gas having a pressure of less than 0.5 mbar.

The stackable molecular spectroscopy cell also includes a metal layer covering an inner surface of the hollow body and an inner surface of the first and second caps, including a first aperture in the metal layer covering the inner surface of the first cap and a second aperture in the metal layer covering the inner surface of the second cap. The first and second apertures are configured such that when a first stackable molecular spectroscopy cell is placed adjacent to a second stackable molecular spectroscopy cell a first aperture in the second stackable molecular spectroscopy cell is aligned with a second aperture in the first stackable molecular spectroscopy cell.

In another implementation, a stacked molecular spectroscopy cell includes first and second stackable molecular spectroscopy cells. Each stackable molecular spectroscopy cell includes a hollow body, a first cap affixed to a first surface of the hollow body, covering a first opening in the hollow body, and a second cap affixed to a second surface of the hollow body, covering a second opening in the hollow body and forming a sealed cavity within the hollow body. The sealed cavity contains a dipolar gas having a pressure of less than 0.5 mbar.

Each stackable molecular spectroscopy cell also includes a metal layer covering an inner surface of the hollow body and an inner surface of the first and second caps, including a first aperture in the metal layer covering the inner surface of the first cap and a second aperture in the metal layer covering the inner surface of the second cap. In the stacked molecular spectroscopy cell, the second stackable molecular spectroscopy cell is placed adjacent to the first stackable molecular spectroscopy cell such that a first aperture in the second stackable molecular spectroscopy cell is placed in alignment with a second aperture in the first stackable molecular spectroscopy cell.

In a further implementation, a method for manufacturing a stackable molecular spectroscopy cell includes providing a hollow body, affixing a first cap to a first surface of the hollow body, covering a first opening in the hollow body, affixing a second cap to a second surface of the hollow body, covering a second opening in the hollow body, and forming a sealed cavity within the hollow body. The sealed cavity contains a dipolar gas having a pressure of less than 0.5 mbar.

The method also includes forming a metal layer covering an inner surface of the hollow body and an inner surface of the first and second caps, forming a first aperture in the metal layer covering the inner surface of the first cap, and forming a second aperture in the metal layer covering the inner surface of the second cap. The first and second apertures are configured such that when a first stackable molecular spectroscopy cell is placed adjacent to a second stackable molecular spectroscopy cell a first aperture in the second stackable molecular spectroscopy cell is aligned with a second aperture in the first stackable molecular spectroscopy cell.

DETAILED DESCRIPTION

In many implementations it is desirable to decrease the footprint of the molecular spectroscopy cell (and the package) without decreasing the total length of the cell of a sensor based on mm-wave spectroscopy. The sensitivity of a spectroscopic device, such as timing standards, gas sensors, magnetometers, and the like depends on the detected absorption signal which is proportional to the length of the molecular spectroscopy cell (as a first order approximation).

Example current implementations use long structures to increase the length of the molecular spectroscopy cells, often including meanders or other structures with corners. However, there are limitations on the radius of curvature for the corners, and other limitations imposed by design rules.

By designing a single molecular spectroscopy cell with a small footprint, and then stacking these cells on top of each other, molecular spectroscopy cells having a variety of lengths are constructed using a single modular design. In example embodiments, each stackable molecular spectroscopy cell includes structures that allow the electromagnetic field to travel from one molecular spectroscopy cell to another. In some embodiments, the molecular spectroscopy cells are hermetically sealed for applications such as timing standards, magnetometers, and the like. While in other embodiments, the molecular spectroscopy cells are "leaky" for applications such as gas sensors.

This modular design of a stacked molecular spectroscopy cells provides for a number of improvements over conventional molecular spectroscopy cells. Stacked molecular spectroscopy cells provide a small footprint with increased resolution by lengthening the molecular spectroscopy cells, and flexibility in design as the number of stacked cells is determined based on market requirement for each given application. Also, if the vacuum of one of the stacked molecular spectroscopy cells is compromised, the sensor (or clock) is still operable, just with a shorter effective length of the molecular spectroscopy cell. In this situation the leaking molecular spectroscopy cell operates as a waveguide within the sensor (or clock). Further, broken molecular spectroscopy cells are replaceable in the field, providing for inexpensive and easy repairs to very expensive devices.

Figure 1:
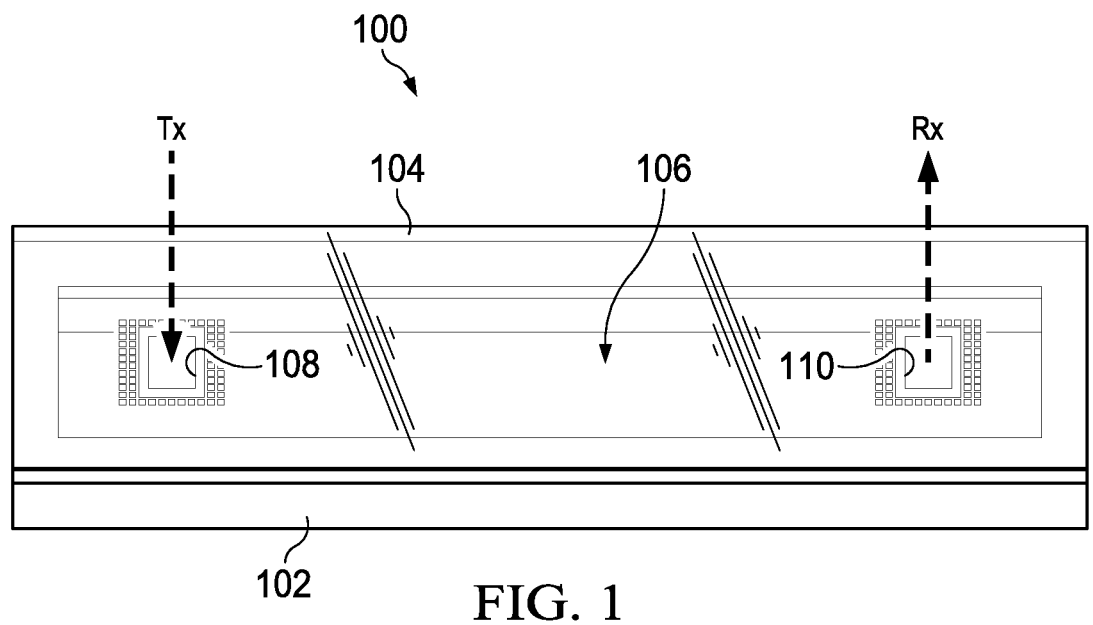
FIG. 1 illustrates an example embodiment of a non-stackable molecular spectroscopy cell.

FIG. 1 illustrates an example embodiment of a non-stackable molecular spectroscopy cell 100. In this example embodiment, a non-stackable molecular spectroscopy cell 100 includes a hollow body 102 with a glass lid 104 affixed on a surface of the hollow body 102 creating a sealed cavity 106 within hollow body 102. The interior of the hollow body 102 and the glass lid 104 are coated with a metal layer.

In this example, a first aperture 108 is patterned and etched through the metal layer forming a first iris for coupling the electromagnetic (EM) field and electromagnetic band gap (EBG) structures with a transmitter (Tx). A second aperture 110 is patterned and etched through the metal layer forming a second iris for coupling the electromagnetic (EM) field and electromagnetic band gap (EBG) structures with a receiver (Rx).

Figure 2:
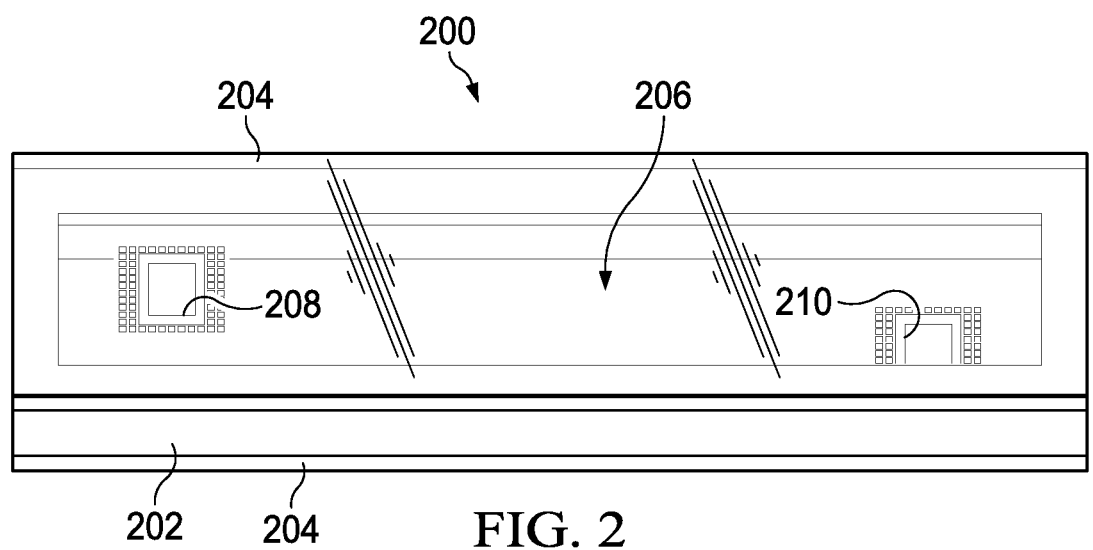
FIG. 2 illustrates an example embodiment of a stackable molecular spectroscopy cell.

FIG. 2 illustrates an example embodiment of a stackable molecular spectroscopy cell 200. In this example embodiment, a stackable molecular spectroscopy cell 200 includes a hollow body 202 with a first glass lid 204 affixed to a first surface of the hollow body 202 and a second glass lid 204 affixed to a second surface opposite of the first surface of the hollow body 202 creating a sealed cavity 206 within hollow body 202. The sealed cavity 206 is hermetically sealed and contains a dipolar gas having a pressure of less than 0.5 mbar (in some embodiments, the dipolar gas is a linear molecule). The interior of the hollow body 102 and the first and second glass lids 204 are coated with a metal layer. In some examples, the hollow body 102 is a truncated hollow cylinder formed by etching a silicon substrate, and the metal is gold.

In this example, a first aperture 208 is patterned and etched through the metal layer of the first glass lid forming a first iris for coupling the electromagnetic (EM) field and electromagnetic band gap (EBG) structures with a transmitter (Tx). A second aperture 210 is patterned and etched through the metal layer of the second forming a second iris for coupling the electromagnetic (EM) field and electromagnetic band gap (EBG) structures with a receiver (Rx).

The two apertures 208 and 210 are matched in size and shape, and located within their respective glass lids such that when a second stackable molecular spectroscopy cell is rotated and stacked upon a first stackable molecular spectroscopy cell, the first aperture of the first stackable molecular spectroscopy cell aligns with the second aperture of the second stackable molecular spectroscopy cell. This configuration allows electromagnetic fields to travel unimpeded between the two stacked molecular spectroscopy cells.

In example embodiments, the first aperture is a first distance from a first side of the hollow body, and the second aperture is the first distance from a second side of the hollow body opposite to the first side of the hollow body, allowing the first and second apertures of first and second stackable molecular spectroscopy cells to align when stacked.

In example embodiments, the hollow body 102 is configured to have dimensions such that it is able to contain an integral number of wavelengths corresponding to a frequency of interrogation for maximum efficiency.

Figure 3:
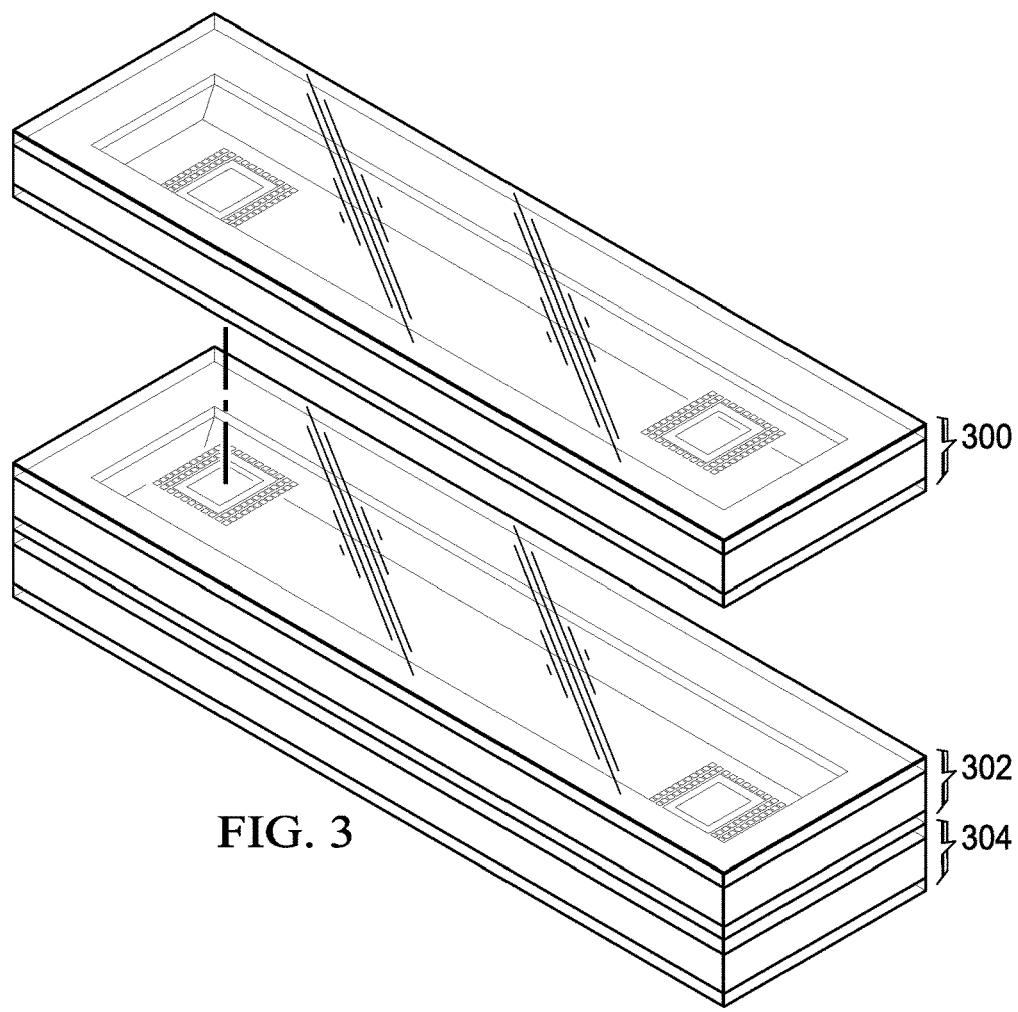
FIG. 3 illustrates an example method of stacking a quantity of stackable molecular spectroscopy cells.

FIG. 3 illustrates an example method of stacking a quantity of stackable molecular spectroscopy cells. In this example, three stackable molecular spectroscopy cells 300, 302, and 304, such as stackable molecular spectroscopy cell 200 illustrated in FIG. 2, are rotated appropriately, aligned, and stacked on top of each other creating a molecular spectroscopy cell having an effective length approximately three times that of a single stackable molecular spectroscopy cell.

Figure 4A:
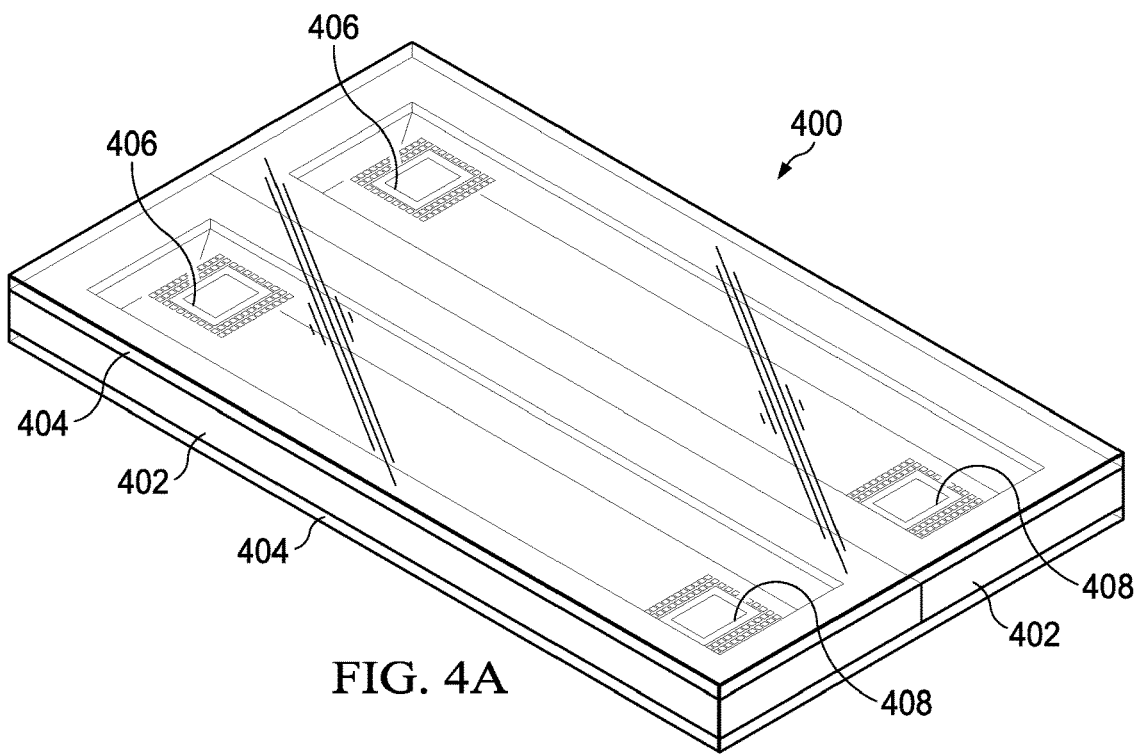
FIG. 4A illustrates an example embodiment of a pair of stackable molecular spectroscopy cells.

FIG. 4A illustrates an example embodiment of a pair of stackable molecular spectroscopy cells. In this example, a pair of stackable molecular spectroscopy cells are manufactured together from a silicon waver substrate which is etched to form the pair of hollow bodies 402. In this example embodiment, a stackable molecular spectroscopy cell 400 includes a pair of hollow bodies 402 with a first glass lid 404 affixed to a first surface of the pair of hollow bodies 402 and a second glass lid 404 affixed to a second surface opposite of the first surface of the pair of hollow bodies 402 creating a pair of sealed cavities within the pair of hollow bodies 402. The interior of the hollow bodies 402 and the first and second glass lids 404 are coated with a metal layer. In some examples, the hollow bodies 402 are truncated hollow cylinders formed by etching a silicon substrate, and the metal is gold.

In this example, two first apertures 406 are patterned and etched through the metal layer of the first glass lid forming first irises for coupling the electromagnetic (EM) field and electromagnetic band gap (EBG) structures with a transmitter (Tx). Two second apertures 408 are patterned and etched through the metal layer of the second forming second irises for coupling the electromagnetic (EM) field and electromagnetic band gap (EBG) structures with a receiver (Rx).

The first and second apertures 406 and 408 are matched in size and shape, and located within their respective glass lids such that when a second stackable molecular spectroscopy cell is rotated and stacked upon a first stackable molecular spectroscopy cell, the first aperture of the first stackable molecular spectroscopy cell aligns with the second aperture of the second stackable molecular spectroscopy cell. This alignment allows electromagnetic fields to travel unimpeded between the two stacked molecular spectroscopy cells.

In example embodiments, the first apertures are a first distance from a first side of the hollow body, and the second apertures are the first distance from a second side of the hollow body opposite to the first side of the hollow body, allowing the first and second apertures of first and second stackable molecular spectroscopy cells to align when stacked.

Figure 4B:
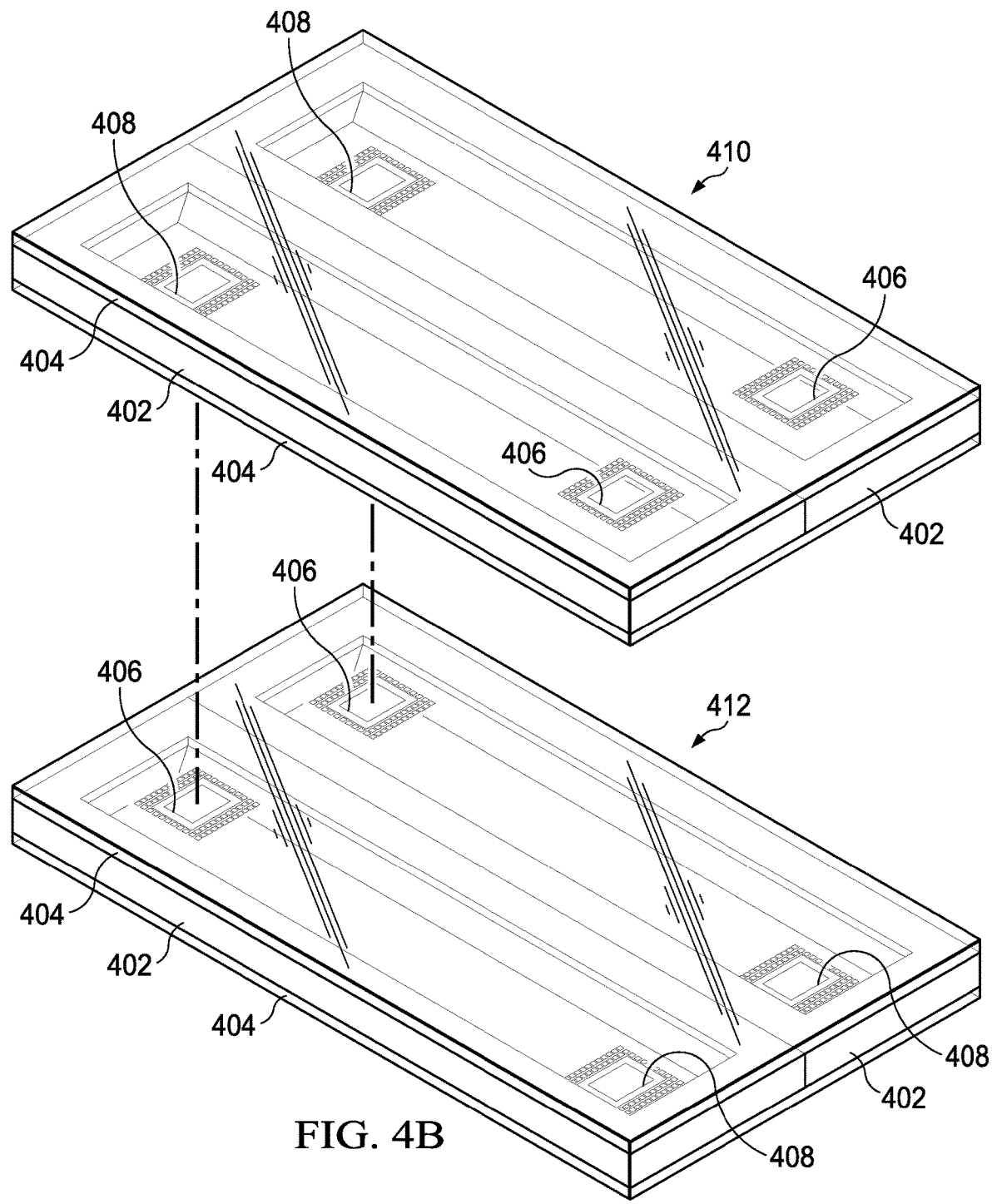
FIG. 4B illustrates an example method of stacking pairs of stackable molecular spectroscopy cells.

FIG. 4B illustrates an example method of stacking pairs of stackable molecular spectroscopy cells. In this example, two paired stackable molecular spectroscopy cells 410 and 412 are rotated appropriately, aligned, and stacked on top of each other creating a molecular spectroscopy cell having an effective length approximately twice that of a single paired stackable molecular spectroscopy cell.

Figure 5A:
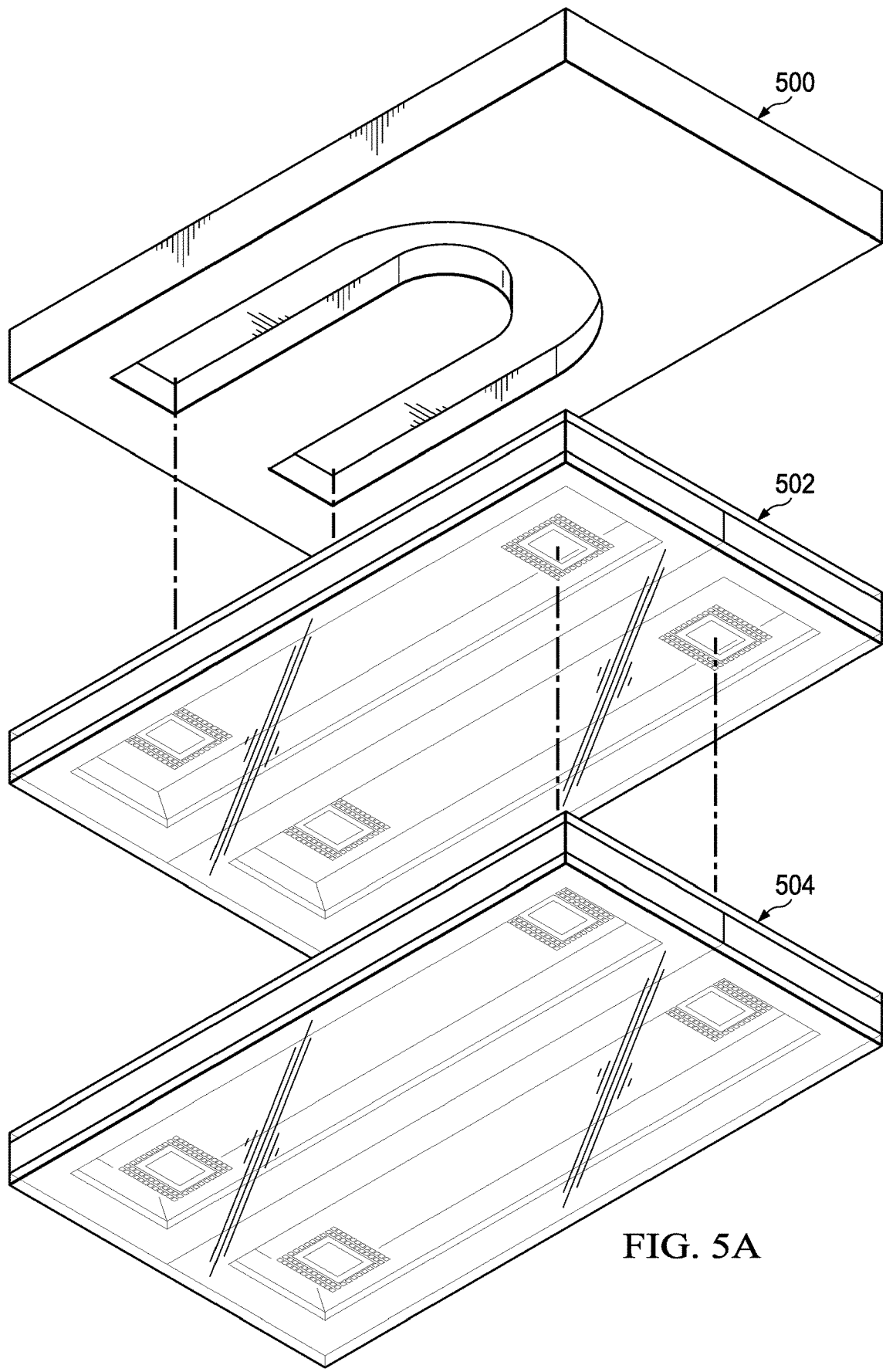
FIGS. 5A and 5B illustrate an example method of stacking pairs of stackable molecular spectroscopy cells.
Figure 5B:
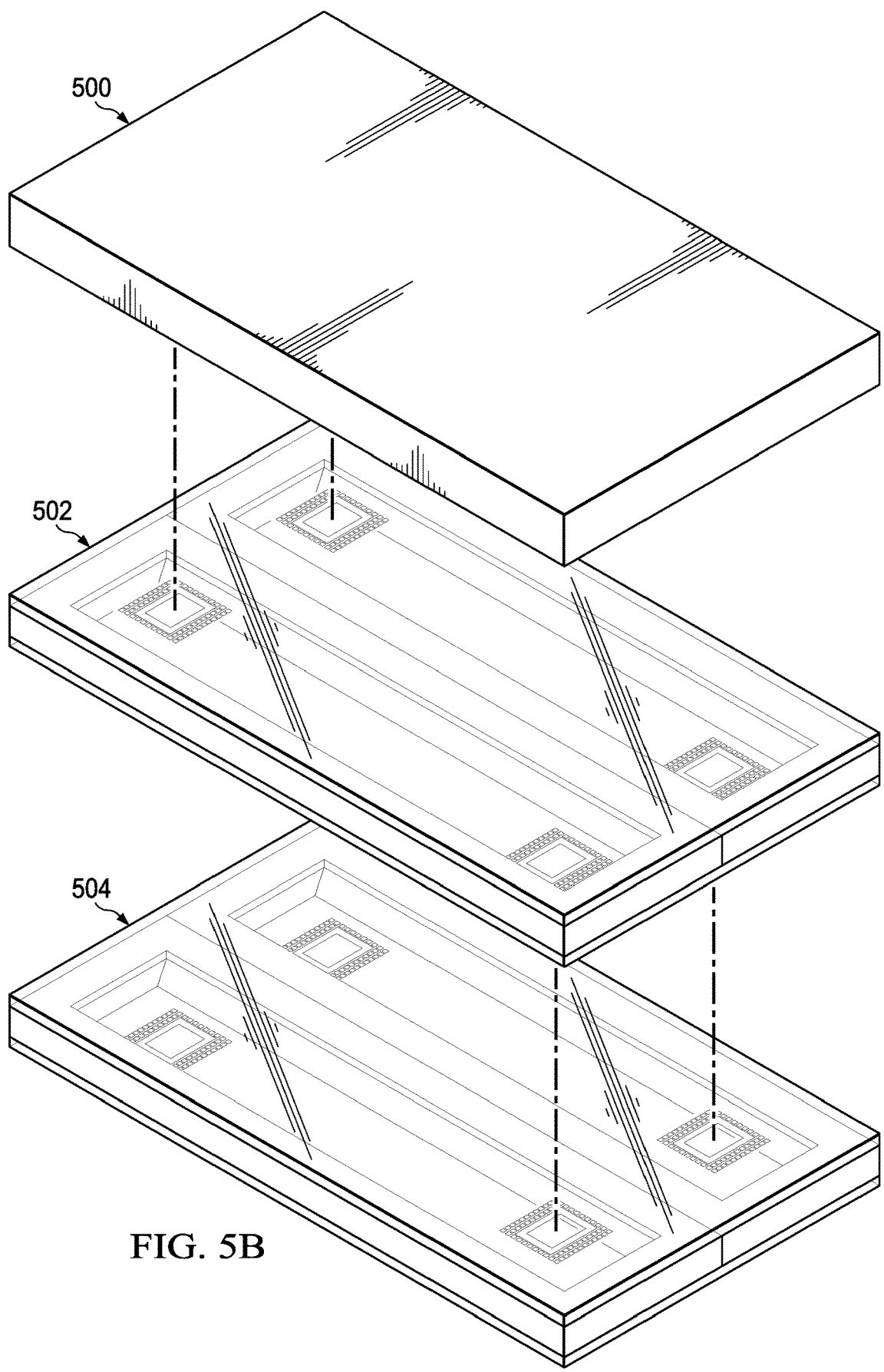

FIGS. 5A and 5B illustrate an example method of stacking pairs of stackable molecular spectroscopy cells. In some embodiments, it is desirable to have the transmitter (Tx) and receiver (Rx) on a single planar surface. Using paired stacked molecular spectroscopy cells, this is accomplished by providing a cap over a top of the stack of paired stackable molecular spectroscopy cells.

FIGS. 5A and 5B illustrate an embodiment of a stacked molecular spectroscopy cell including a cap 500 and two paired stackable molecular spectroscopy cells 502 and 504. In this example, the cap includes a metal coated path for the electromagnetic field to travel from an upper aperture in one of the paired stackable molecular spectroscopy cells to an upper aperture in the other of the paired stackable molecular spectroscopy cells. This provides a path for the electromagnetic field to travel up from a transmitter through one side of the paired stacked molecular spectroscopy cells, around the path within the cap and down to a receiver through the other side of the paired stacked molecular spectroscopy cells.

In one example embodiment, the cap is 3D printed and then metal coated. In other example embodiments, the cap is formed in a silicon substrate and then metal coated.

Figure 6A:
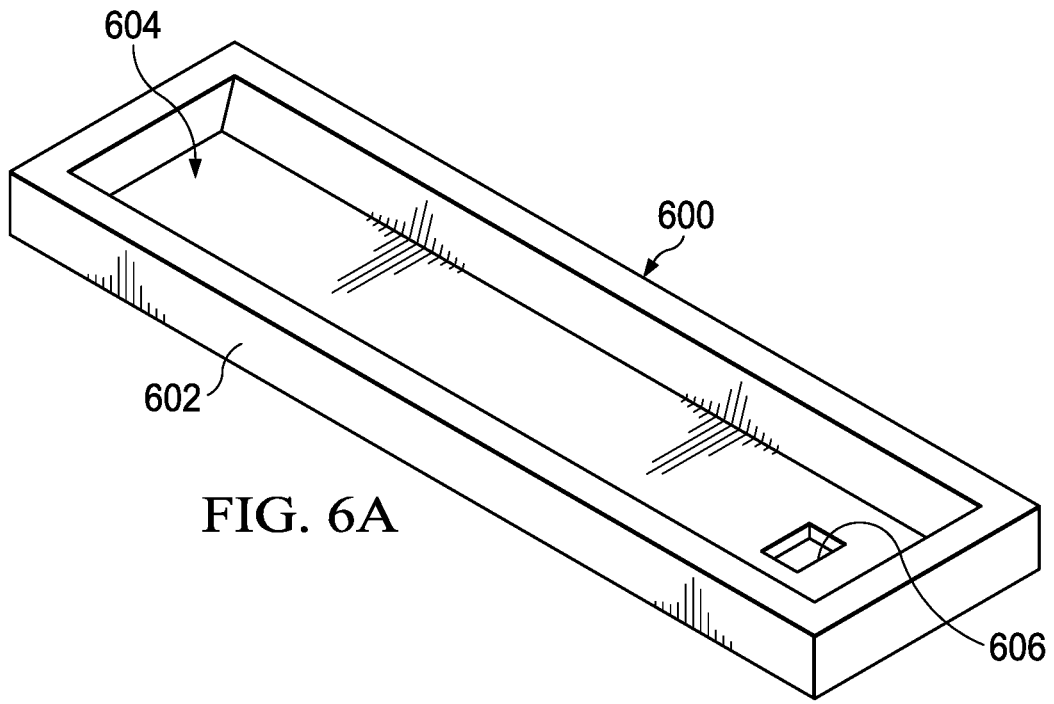
FIGS. 6A and 6B illustrate an example method of manufacturing a stackable molecular spectroscopy cell.
Figure 6B:
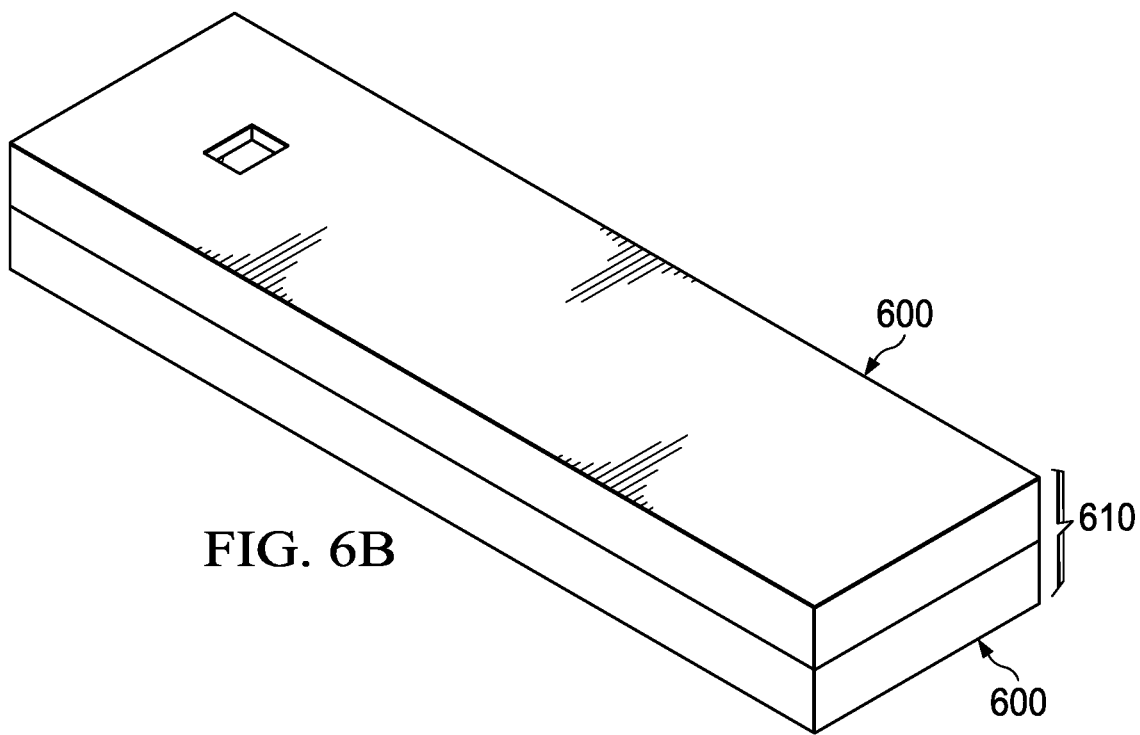

FIGS. 6A and 6B illustrate an example method of manufacturing a stackable molecular spectroscopy cell. In an alternate method of manufacturing a stackable molecular spectroscopy cell 600, a silicon substrate 602 is etched to form one half of a cavity 604 and an aperture 606. Two of these half cavities 600 are then bonded together to form a stackable molecular spectroscopy cell 610.

Figure 6C:
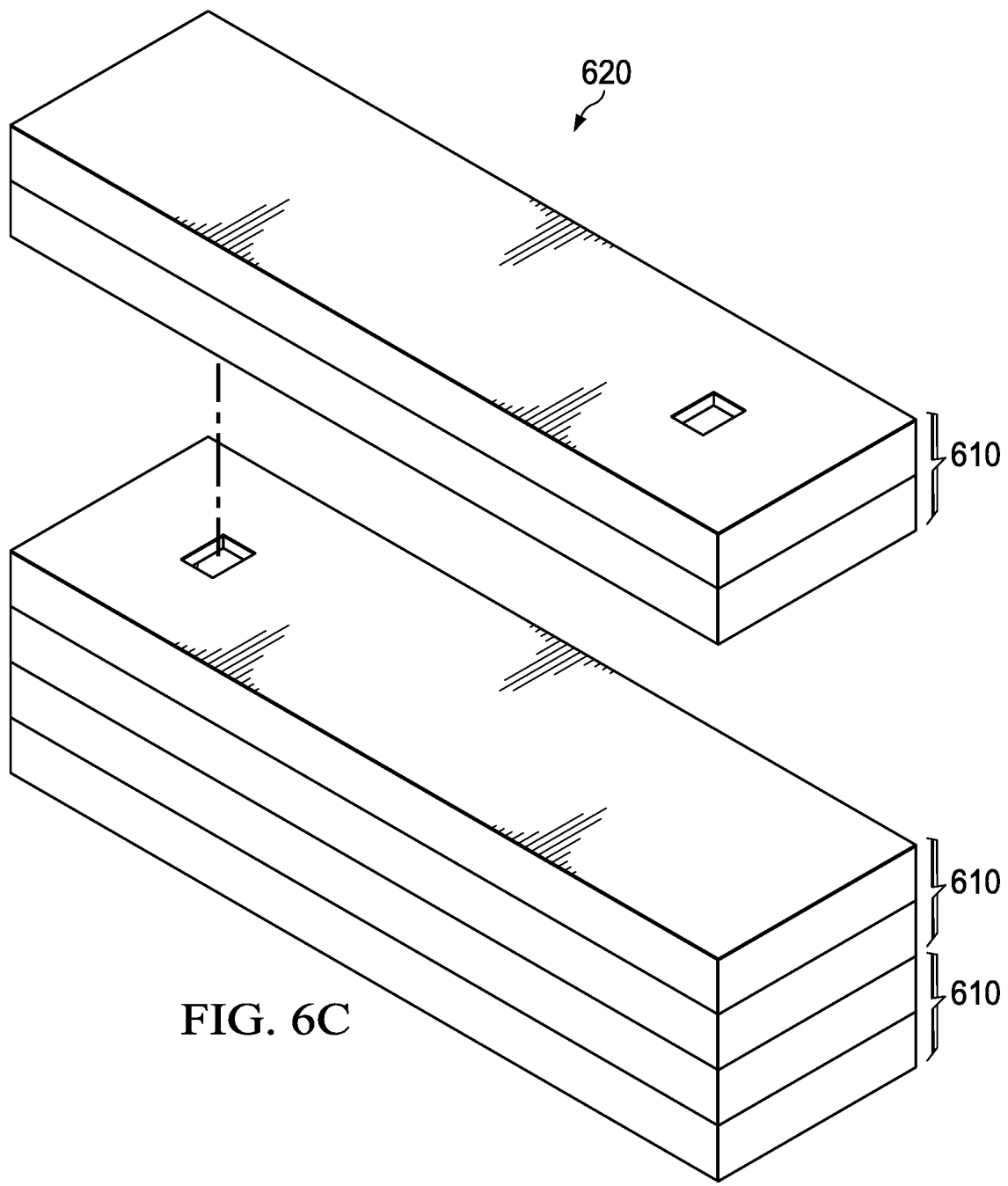
FIG. 6C illustrates an example method of stacking a quantity of stackable molecular spectroscopy cells.

FIG. 6C illustrates an example method of stacking a quantity of stackable molecular spectroscopy cells. Similar to the stackable molecular spectroscopy cells described above and illustrated in FIG. 2, multiple stackable molecular spectroscopy cells 610 are rotated appropriately, aligned, and stacked together to form a stacked molecular spectroscopy cell 620 having an effective length approximately three times that of a single stackable molecular spectroscopy cell.

In this example, any quantity of these stackable molecular spectroscopy cells are affixed together. They are then placed under a vacuum, filled with gas and then glass windows (not shown) are bonded to the top and bottom of the stack to seal the cavity. While this embodiment provides several advantages, once constructed, it is no longer modular and individual cells are not replaceable.

Figure 7:
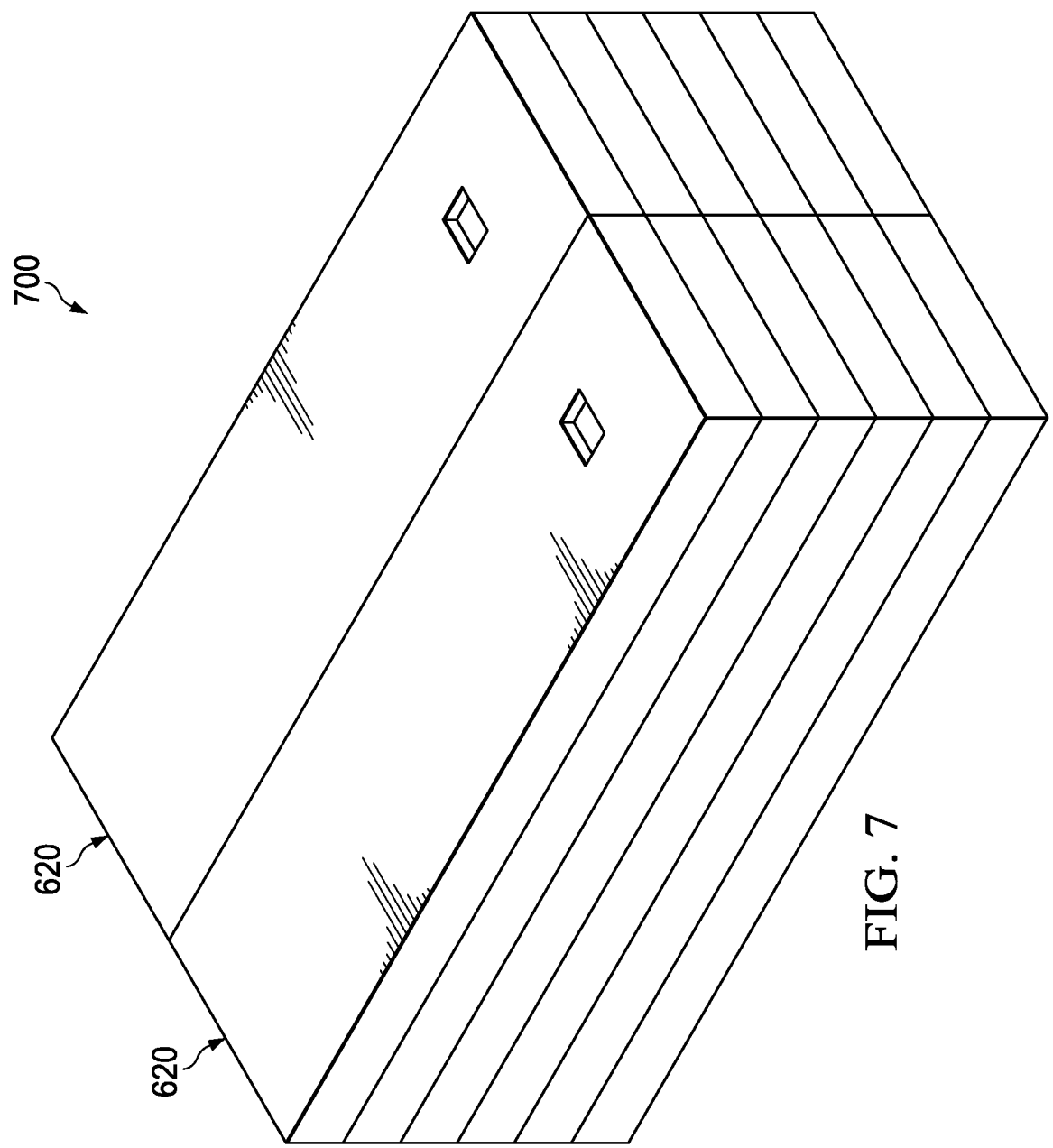
FIG. 7 illustrates an example stacked molecular spectroscopy cell.

FIG. 7 illustrates an example stacked molecular spectroscopy cell. Similar to the construction of a stacked molecular spectroscopy cell from paired stackable molecular spectroscopy cells illustrated in FIG. 4B, a stacked molecular spectroscopy cell 700 is created from a pair of stacked molecular spectroscopy cells 620 from FIG. 6C. When a cap, similar to that illustrated in FIGS. 5A and 5B and described above, is added to this module, a stacked molecular spectroscopy cell module is produced allowing the transmitter (Tx) and receiver (Rx) to reside on a single planar surface.

Figure 8:
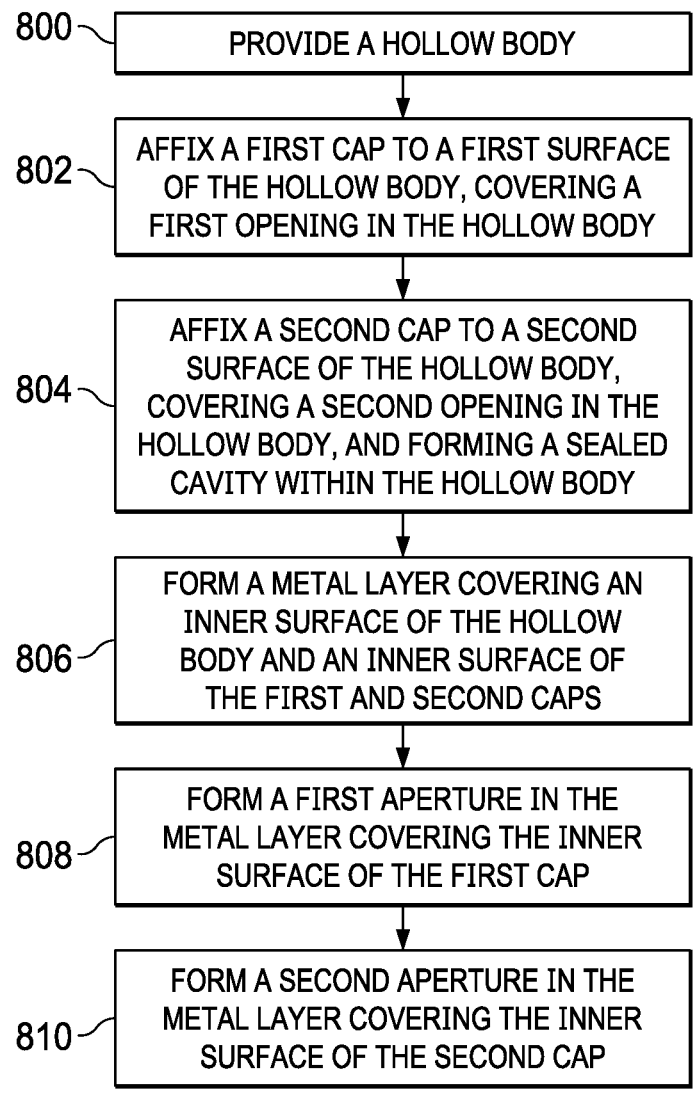
FIG. 8 is a flow chart illustrating an example method for manufacturing a stackable molecular spectroscopy cell for a millimeter wave molecular spectroscopy system.

FIG. 8 is a flow chart illustrating an example method for manufacturing a stackable molecular spectroscopy cell for a millimeter wave molecular spectroscopy system. In this example embodiment, a hollow body 202 is provided, (operation 800). A first cap 204 is affixed to a first surface of the hollow body 202, covering a first opening in the hollow body 202, (operation 802).

A second cap 204 is affixed to a second surface of the hollow body 202, covering a second opening in the hollow body 202, and forming a sealed cavity within the hollow body 202, (operation 804). A metal layer is formed covering an inner surface of the hollow body 202 and an inner surface of the first and second caps 204, (operation 806).

A first aperture 208 is formed in the metal layer covering the inner surface of the first cap 204, (operation 808). A second aperture 210 is formed in the metal layer covering the inner surface of the second cap 204, (operation 810).

Figure 9:
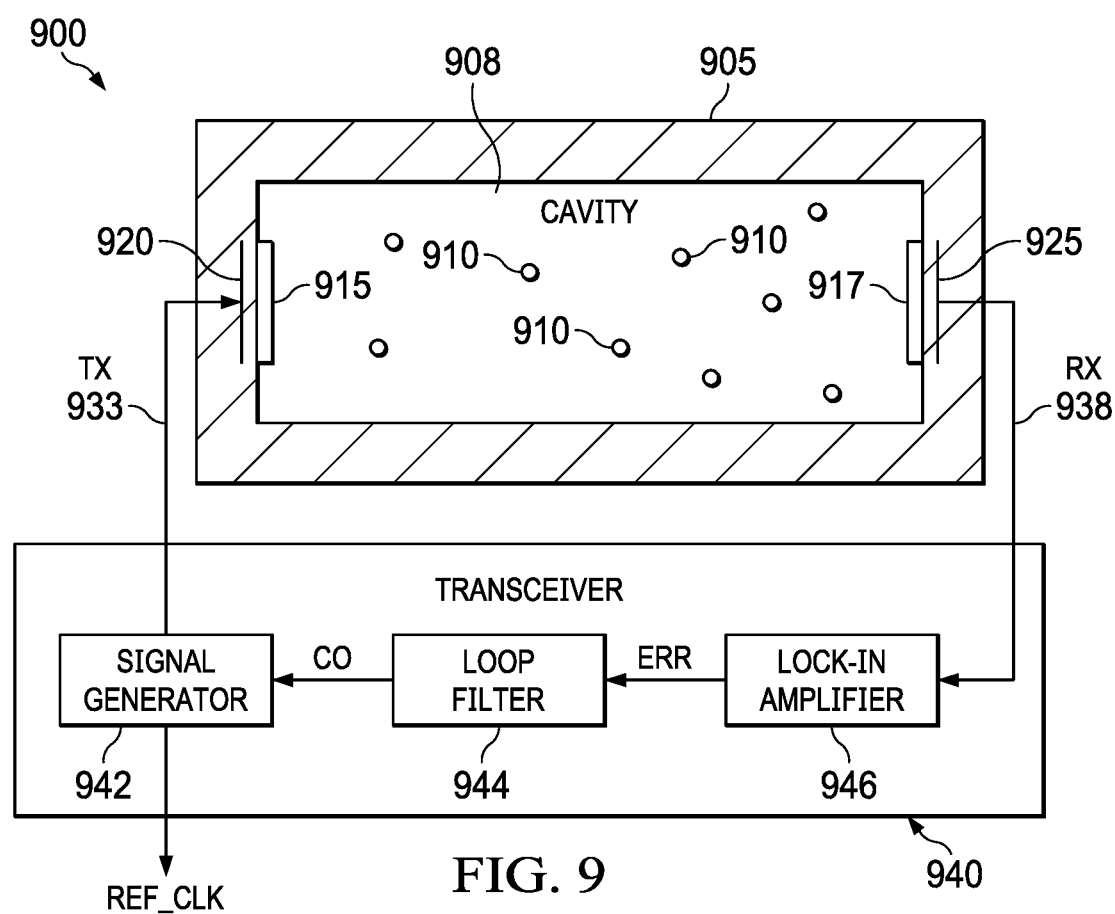
FIG. 9 illustrates a block diagram for a clock generator in accordance with various embodiments.

FIG. 9 illustrates a block diagram for a clock generator 900 in accordance with various embodiments. The clock generator 900 is a millimeter wave atomic clock that generates a reference frequency associated with the transition of dipolar molecules 910 contained in a hermetically sealed cavity 908 formed in semiconductor material from a state with low rotational energy to a state with higher rotational energy. This reference frequency produced by quantum rotation of the selected dipolar molecules 910 is unaffected by circuit aging and does not vary with temperature or other environmental factors.

The clock generator 900 of FIG. 9 includes a vapor cell 905 formed in this example from various materials as described above. The cell 905 includes a cavity 908 with a sealed interior enclosing a dipolar molecule material gas 910, for example, water ($H_2O$) or any other dipolar molecule gas at a relatively low gas pressure inside the cavity 908. Examples of suitable electrical dipolar material gases include water, acetonitrile ($CH_3CN$) and hydrogen cyanide (HCN). As shown in FIG. 9, the clock generator 900 further includes a transceiver 940 with a transmit output 933 for providing an electrical transmit signal (TX) to the vapor cell 905, as well as a receiver input 938 for receiving an electrical input signal (RX) from the vapor cell 905. The rotational transition vapor cell 905 does not necessarily require optical interrogation, and can operate through electromagnetic interrogation of mm-wave and micro-wave electromagnetic signals via the transmit and receive signals (TX, RX) provided by the transceiver 940.

The sealed cavity 908 includes a conductive interior cavity surface, as well as first and second non-conductive apertures 915 and 917 formed in the interior cavity surface for providing an electromagnetic field entrance and an electromagnetic field exit, respectively. In one example, the apertures 915 and 917 magnetically couple into the (traverse electric) TE10 (dominant) mode of the cavity 908. In other examples, the apertures 915 and 917 excite higher order modes. First and second conductive coupling structures 920 and 925 are formed on an outer surface of the vapor cell 905 proximate the first and second non-conductive apertures 915 and 917, respectively. The coupling structures 920 and 925 may be the antenna(s) described above and may comprise a conductive strip formed on a surface of one of the materials forming the cell 905. Each coupling structure 920, 925 may overlie and cross over the corresponding non-conductive aperture 915, 917 for providing an electromagnetic interface to couple a magnetic field in to (based on the transmit signal TX from the transceiver output 933) the cavity 908 or from the cavity to the transceiver RX input 938. The proximate location of the conductive coupling structures 920, 925 and the corresponding non-conductive apertures 915, 917 advantageously provides electromagnetically transmissive paths through the first or second cap, which can be any electromagnetically transmissive material.

The transceiver circuit 940 in certain implementations is implemented on or in an integrated circuit (not shown), to which the vapor cell 905 is electrically coupled for transmission of the TX signal via the output 933 and for receipt of the RX signal via the input 938. The transceiver 940 is operable when powered for providing an alternating electrical output signal TX to the first conductive coupling structure 920 for coupling an electromagnetic field to the interior of the cavity 908, as well as for receiving the alternating electrical input signal RX from the second conductive coupling structure 925 representing the electromagnetic field received from the cavity 908. The transceiver circuit 940 is operable for selectively adjusting the frequency of the electrical output signal TX in order to reduce the electrical input signal RX by interrogation to operate the clock generator 900 at a frequency which substantially maximizes the molecular absorption through rotational motor state transitions, and for providing a reference clock signal REF_CLK at the frequency of the TX output signal.

In certain examples, the transceiver 940 includes a signal generator 942 with an output 933 electrically coupled with the first conductive coupling structure 920 for providing the alternating electrical output signal TX, and for providing the reference clock signal REF_CLK at the corresponding transmit output frequency. The transmitter 940 also includes a lock-in amplifier circuit 946 with an input 938 coupled from the second conductive coupling structure 925 for receiving the RX signal. In an example embodiment, the signal generator 942 includes an additional input to which a function generator (not shown) is connected and modulates the amplitude of the electromagnetic signal at approximately 10 kHz. The 10 kHz signal is also connected to the reference input of the lock-in amplifier 946 and is used to demodulate the RX signal and create the ERR signal.

The lock-in amplifier 946 operates to provide an error signal ERR representing a difference between the RX signal and the electrical output signal TX. In one example, the lock-in amplifier 946 provides the error signal ERR as an in-phase output, and the error signal ERR is used as in input by a loop filter 944 to provide a control output signal CO to the signal generator 942 for selectively adjusting the TX output signal frequency to maintain this frequency at a peak absorption frequency of the dipolar molecular gas 910 inside the sealed interior of the cavity 908. In some examples, the RF power of the TX and RX loop is controlled so as to avoid or mitigate stark shift affects.

The electromagnetic coupling via the non-conducting apertures 920, 925 and corresponding conductive coupling structures 915, 917 facilitates electromagnetic interrogation of the dipolar gas 910 within the cell cavity 908. In one example form of operation, the clock generator 900 operates with the signal generator 942 transmitting alternating current (AC) TX signals at full transmission power at various frequencies within a defined band around a suspected quantum absorption frequency at which the transmission efficiency of the vapor cell 905 is minimal (absorption is maximal). For example, the quantum absorption frequency associated with the dipolar water molecule is 183.31 GHz. When the system operates at the quantum frequency, a null or minima is detected at the receiver via the lock-in amplifier 946, which provides the error signal ERR to loop filter 944 for regulation of the TX output signal frequency via the control output CO signal provided to the signal generator 942. The output of lock-in amplifier 946 should be very close to zero. The rotational quantum frequency of the dipolar molecule gas 910 in the vapor cell cavity 908 is generally stable with respect to time (does not degrade or drift over time), and is largely independent of temperature and a number of other variables.

In one embodiment, the signal generator 942 initially sweeps the transmission output frequency through a band known to include the quantum frequency of the cell 905 (e.g., transitioning upward from an initial frequency below the suspected quantum frequency, or initially transitioning downward from an initial frequency above the suspected quantum frequency, or other suitable sweeping technique or approach). The transceiver 940 monitors the received energy via the input 938 coupled with (e.g., electrically connected to) the second conductive coupling structure 925 in order to identify the transmission frequency associated with peak absorption by the gas in the cell cavity 908 (e.g., minimal reception at the receiver). Once the quantum absorption frequency is identified, the loop filter 944 moves the source signal generator transmission frequency close to that absorption frequency (e.g., 183.31 GHz), and modulates the signal at a very low frequency to regulate operation around the null or minima in the transmission efficiency representing the ratio of the received energy to the transmitted energy. The loop filter 944 provides negative feedback in a closed loop operation to maintain the signal generator 942 operating at a TX frequency corresponding to the quantum frequency of the cavity dipolar molecule gas 910.

In steady state operation, the lock-in amplifier 946 and the loop filter 944 maintain the transmitter frequency at the peak absorption frequency of the cell gas 910. In one example, the loop filter 944 provides proportional-integral-derivative (PID) control using a derivative of the frequency error as a control factor for lock-in detection and closed loop regulation. At the bottom of the null in a transmission coefficient curve, the derivative is zero and the loop filter 944 provides the derivative back as a direct current (DC) control output signal CO to the signal generator 942. This closed loop operates to keep the signal generator transmission output frequency at the peak absorption frequency of the cell gas 910 using lock-in differentiation based on the RX signal received from the cell 908. The REF_CLK signal from the signal generator 942 is the TX signal clock and can be provided to other circuitry such as frequency dividers and other control circuits requiring the use of a clock.

Figure 10:
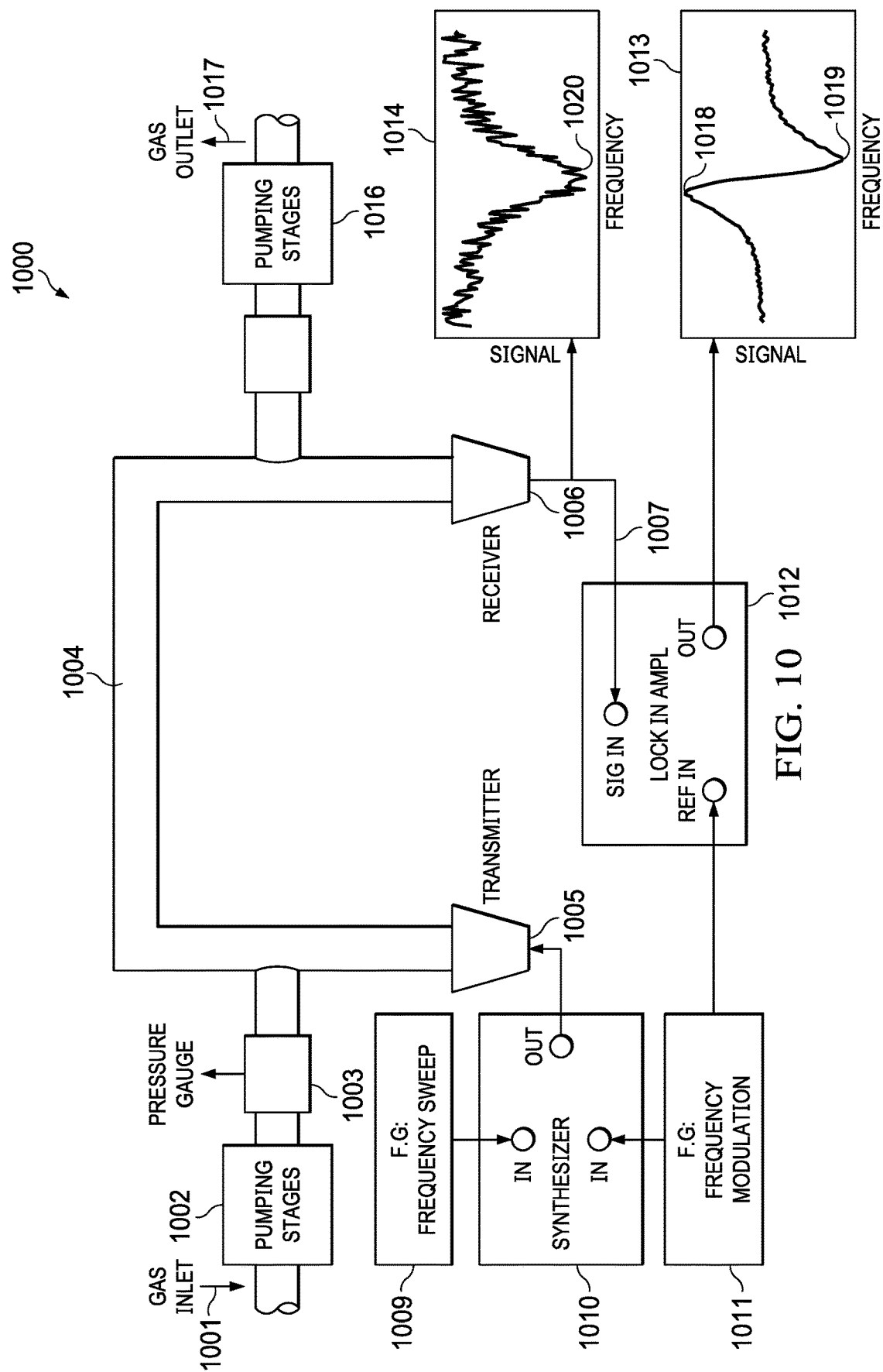
FIG. 10 illustrates an example system of a conventional millimeter wave spectroscopy system including external electronic devices.

FIG. 10 illustrates an example system 1000 of a millimeter wave spectroscopy system including stacked molecular spectroscopy cells. The system includes gas inlet 1001 connected to mass flow controller 1002 that is monitored with pressure gauges 1003. The gas is pumped into molecular spectroscopy cell 1004, and pumped out with a second pumping device 1016 and gas outlet 1017. A millimeter wave electromagnetic signal is transmitted into molecular spectroscopy cell 1004. In this example embodiment molecular spectroscopy cell 1004 comprises a stacked molecular spectroscopy cell as illustrated in FIGS. 2-8 and described in detail above.

According to an example embodiment, a frequency of the electromagnetic signal ranges from 60 GHz to 300 GHz. The electromagnetic signal is received by receiver 1006 and synced into input 1007 of lock-in amplifier 1012 to frequency source 1011 and absorption across the frequency range is generated. The output signal of the receiver is monitored with a chart 1014 or other electronic data recording device. In some example embodiments, this will tend to just be a diode detector configured to convert the output signal to a low frequency readout for comparison to the input. In example configurations, it is not plotted for monitoring, but rather tracked by the feedback and control loop (lock-in amplifier). The output signal of the lock-in amplifier is monitored with another chart 1013 or other electronic recording device.

Lock-in detection is a way to increase the signal to noise ratio (SNR). Essentially the lock-in amplifier is a very good bandpass filter that detects signals only around certain frequency. In this example system the signal coming out of the synthesizer is frequency modulated (FM). This signal interacts with the molecules and then received on the receiver. The lock-in amplifier detects only signals at the modulation frequency, and thus, the SNR is increased compared to the signal in chart 1014.

This example device includes a transceiver electrically coupled to the first 1005 and second 1006 antennas and configured to inject a transmit signal into molecular spectroscopy cell 1004 through the first antenna, the signal interrogates the molecules in the cavity generating absorption dips at the quantum transition frequencies of the gases in the cavity, the signal is detected in the second antenna. By scanning a frequency band of interest, it is possible to detect the presence of different gases in the cavity by identifying the quantum absorption frequencies.

Synthesizer 1010 receives input from frequency generator 1009 and frequency modulator 1011 and outputs a signal to the molecular spectroscopy cell. In one example embodiment, signal generator 1009 initially sweeps the transmission output frequency through a band known to include the quantum transitions of the gases in molecular spectroscopy cell 1004 (e.g., transitioning upward from an initial frequency below the suspected quantum transition frequency, or initially transitioning downward from an initial frequency above the suspected quantum transition frequency, or other suitable sweeping technique or approach).

The transceiver monitors the received energy via an input coupled with (e.g. electrically connected to) a second conductive coupling structure in order to identify the transmission frequency associated with peak absorption by the gas in the molecular spectroscopy cell 1004 (e.g., minimal reception at the receiver). Once the quantum absorption frequency is identified, a loop filter moves the source signal generator transmission frequency close to that absorption frequency (e.g., 183.31 GHz), and modulates the signal at a very low frequency to regulate operation around the null or minima in the transmission efficiency representing the ratio of the received energy to the transmitted energy.

The loop filter provides negative feedback in a closed loop operation to maintain the signal generator operating at a transmit (TX) frequency corresponding to the quantum frequency of the cavity dipolar molecule gas and dynamically adjusts a frequency of the transmit signal based on the error signal. The transceiver circuit in certain implementations is implemented on or in an integrated circuit (not shown), to which the molecular spectroscopy cell 1004 is electrically coupled for transmission of the TX signal via output 1005 and for receipt of the RX signal via input 1006.

The transceiver is operable when powered for providing an alternating electrical output signal TX to the first conductive coupling structure for coupling an electromagnetic field to the interior of molecular spectroscopy cell 1004, as well as for receiving the alternating electrical input signal RX from a second conductive coupling structure representing the electromagnetic field received from molecular spectroscopy cell 1004. The transceiver circuit is operable for selectively adjusting the frequency of the electrical output signal TX in order to reduce the electrical input signal receive RX by interrogation to operate clock generator 1009 at a frequency which substantially maximizes the molecular absorption through rotational state transitions, and for providing a reference clock signal REF_CLK at the frequency of the TX output signal.

Modifications are possible in the described examples, and other examples are possible within the scope of the claims.

What is claimed is:

1. A device comprising:
    a first stackable molecular spectroscopy cell comprising:
        a hollow body;
        a first cap affixed to a first surface of the hollow body, covering a first opening in the hollow body;
        a second cap affixed to a second surface of the hollow body, covering a second opening in the hollow body, and forming a sealed cavity within the hollow body;
        a dipolar gas having a pressure of less than 0.5 mbar within the sealed cavity; and
        a metal layer covering an inner surface of the hollow body and an inner surface of the first and second caps;
        a first aperture formed in the metal layer covering the inner surface of the first cap; and
        a second aperture formed in the metal layer covering the inner surface of the second cap;
    a second stackable molecular spectroscopy cell comprising:
        a first aperture; and
        a second aperture;
    wherein the first aperture of the first stackable molecular spectroscopy cell is aligned with the second aperture of the second stackable molecular spectroscopy cell; and
        the second aperture of the first stackable molecular spectroscopy cell is aligned with the first aperture of the second stackable molecular spectroscopy cell;
    wherein the first aperture of the first stackable molecular spectroscopy cell is a first iris coupling electromagnetic field and electromagnetic band gap structures with a first transmitter;
    wherein the second aperture of the first stackable molecular spectroscopy cell is a second iris coupling electromagnetic field and electromagnetic band gap structures with a first receiver;
    wherein the first aperture of the second stackable molecular spectroscopy cell is a third iris coupling electromagnetic field and electromagnetic band gap structures with a second transmitter;
    wherein the second aperture of the first stackable molecular spectroscopy cell is a fourth iris coupling electromagnetic field and electromagnetic band gap structures with a second receiver;
    wherein the alignment of the first stackable molecular spectroscopy cell and the second stackable molecular spectroscopy cell allows electromagnetic fields to travel unimpeded between the first and second stacked molecular spectroscopy cells.

2. The device of claim 1, wherein the hollow body is a truncated hollow cylinder.

3. The device of claim 1, wherein the hollow body is formed by etching a silicon substrate.

4. The device of claim 1, wherein the metal layer comprises gold.

5. The device of claim 1, wherein the first and second caps comprise glass.

6. The device of claim 1, wherein the first and second apertures are etched into the metal layer.

7. The device of claim 1, wherein the first and second apertures are matched in size and shape.

8. The device of claim 6, wherein the first aperture is a first distance from a first side of the hollow body, and the second aperture is the first distance from a second side of the hollow body opposite to the first side of the hollow body.

9. A device comprising:
first and second stackable molecular spectroscopy cells, each of the first and second stackable molecular spectroscopy cells comprising:
a respective hollow body;
a respective first cap affixed to a first surface of the hollow body, covering a first opening in the hollow body;
a respective second cap affixed to a second surface of the hollow body, covering a second opening in the hollow body and forming a sealed cavity within the hollow body;
a respective dipolar gas having a pressure of less than 0.5 mbar within the sealed cavity; and
a respective metal layer covering an inner surface of the hollow body and an inner surface of the first and second caps, including a first aperture in the metal layer covering the inner surface of the first cap and a second aperture in the metal layer covering the inner surface of the second cap;
wherein the second stackable molecular spectroscopy cell is placed adjacent to the first stackable molecular spectroscopy cell such that a first aperture in the second stackable molecular spectroscopy cell is placed in alignment with a second aperture in the first stackable molecular spectroscopy cell;
wherein the first aperture of the first stackable molecular spectroscopy cell is a first iris coupling electromagnetic field and electromagnetic band gap structures with a first transmitter;
wherein the second aperture of the first stackable molecular spectroscopy cell is a second iris coupling electromagnetic field and electromagnetic band gap structures with a first receiver;
wherein the first aperture of the second stackable molecular spectroscopy cell is a third iris coupling electromagnetic field and electromagnetic band gap structures with a second transmitter;
wherein the second aperture of the first stackable molecular spectroscopy cell is a fourth iris coupling electromagnetic field and electromagnetic band gap structures with a second receiver;
wherein the alignment of the first stackable molecular spectroscopy cell and the second stackable molecular spectroscopy cell allows electromagnetic fields to travel unimpeded between the first and second stacked molecular spectroscopy cells.

10. The device of claim 9, wherein the hollow body is a truncated hollow cylinder.

11. The device of claim 9, wherein the hollow body is formed by etching a silicon substrate.

12. The device of claim 9, wherein the metal layer comprises gold.

13. The device of claim 9, wherein the first and second caps comprise glass.

14. The device of claim 9, wherein the first and second apertures are etched into the metal layer.

15. The device of claim 9, wherein the first and second apertures are matched in size and shape.

16. The device of claim 15, wherein the first aperture is a first distance from a first side of the hollow body, and the second aperture is the first distance from a second side of the hollow body opposite to the first side of the hollow body.

* * * * *